United States Patent Office 2,969,397
Patented Jan. 24, 1961

2,969,397
2-METHYL-8-PHENYL-7-NONEN-4-ONE

Waldemar Guex, Bottmingen, Switzerland, assignor to Hoffmann-La Roche Inc., Nutley, N.J., a corporation of New Jersey No Drawing. Filed Oct. 2, 1958, Ser. No. 764,780

Claims priority, application Switzerland Oct. 18, 1957

1 Claim. (Cl. 260—590)

This invention relates to the unsaturated ketone 2-methyl-8-phenyl-7-nonen-4-one and to methods for the production thereof. Briefly, the said ketone may be produced by treating phenyl-methyl-ethenyl carbinol with isovaleroyl acetate, then heating the reaction mixture so as to rearrange and decarboxylate the intermediate formed or, alternatively, converting the same carbinol with a halogenating agent to phenyl-methyl-allyl halide, condensing the latter with a mono alkali metal derivative of isovaleroyl acetate, then saponifying and decarboxylating the reaction product.

According to the one modification of the invention, phenyl-methyl-ethenyl carbinol is heated with isovaleroyl acetate at a temperature in the range of about 140–190° C. An isovaleroyl acetate derivative forms as an intermediate which directly undergoes rearrangement and decarboxylation as a result of the heating to form 2-methyl-8-phenyl-7-nonen-4-one. The conversion is preferably effected in the presence of an aluminum lower alkoxide, for example, aluminum isopropoxide.

According to the alternate modification of the invention, the same ketone may be produced by first treating phenyl-methyl-ethenyl carbinol with a halogenating agent, for example, a phosphorus halide, such as phosphorus tribromide, phosphorus trichloride, etc., or a hydrogen halide, such as hydrogen chloride, hydrogen bromide, hydrogen iodide, etc. Allyl rearrangement occurs and phenyl-methyl-allyl halide is obtained. The phenyl-methyl-allyl halide is then condensed with an alkali metal derivative of isovaleroyl acetate. The alkali metal derivative may be produced, for example, by reacting isovaleroyl acetate with an alkali metal alcoholate, e.g. sodium ethoxide, in a solvent. The crude isovaleroyl acetate condensation product formed by the reaction of the phenyl-methyl-allyl halide with the alkali metal derivative of isovaleroyl acetate may be utilized directly without further purification, if desired. The unsaturated ketone is obtained from this intermediate by saponification and decarboxylation. This may be effected either in one operation or stagewise in two steps. The substituted isovaleroyl acetate intermediate may be heated in aqueous alcoholic alkali hydroxide, such as ethanolic sodium hydroxide, whereupon the formation of the ketone occurs in one step. Alternatively, the conversion may be also effected in two steps by mildly saponifying the substituted isovaleroyl acetate, e.g., by means of dilute alkali metal hydroxide, and heating an aqueous acid, e.g. hydrohalic acid, solution of the free substituted isovaleric acid.

The ketone is obtained in more or less pure form according to the choice of reaction conditions. Further purification of the reaction mixture obtained is not necessary since it has been found that the crude product obtained may be directly used for the preparation of perfumery mixtures. The product may, however, be further purified, if desired, by conventional procedures, such as distillation, solvent extraction and reprecipitation, chromatography, etc.

The 2-methyl-8-phenyl-7-nonen-4-one obtained according to this invention has an odor reminiscent of musk and civet. It is useful as an odor-imparting component of perfumes and of scented compositions generally.

The invention is illustrated by the following examples without being limited thereby. All temperatures are expressed in degrees centigrade.

Example 1

136 g. phenyl-methyl-ethenyl carbinol and 172 g. isovaleroyl acetate were treated with 2 g. aluminum isopropoxide, then heated for two hours at 160–190°. Distilling off of alcohol was accompanied by the evolution of about 20 liters of carbon dioxide. The reaction mixture was taken up in ether and washed in sequence with dilute hydrochloric acid, dilute sodium hydroxide solution and then with water. The ether solution was dried, filtered and concentrated. The residue was then distilled under high vacuum. After separating a short forerun, the product, 2-methyl-8-phenyl-7-nonen-4-one, was obtained at 110–115°/0.1 mm. as a light yellow oil with a sweet civet and mush odor; $n_D^{20}=1.520$.

Example 2

30 g. phenyl-methyl-ethenyl carbinol were dissolved in 100 cc. absolute ether. While cooling and stirring, 27 g. phosphorus tribromide were added. The reaction was permitted to continue for one hour at room temperature. The reaction mixture was then washed with ice water, the ether solution was dried with sodium sulfate and filtered. The filtrate was then directly used in the next step.

35 g. isovaleroyl acetate were added at 10° to a solution of 4.6 g. sodium in 100 cc. absolute alcohol. The sodium derivative of the ester was thus obtained in the form of a thick crystalline slurry. The solution obtained as described in the first paragraph of this example, which comprised phenyl-methyl-allyl bromide, was added to the crystalline slurry and the mixture became fluid. The ether was distilled off while stirring. The remaining alcoholic mixture was refluxed for an additional 1½ to 2 hours and then treated with a solution of 15 g. potassium hydroxide in 40 cc. water. This mixture was permitted to boil for 2 hours. After cooling, it was diluted with 300 cc. water and extracted with 100 cc. of benzene. The benzene solution was washed several times with water and the solvent was distilled off in vacuo. The residue was fractionated under high vacuum. After separation of a short forerun, the product, 2-methyl-8-phenyl-7-nonen-4-one, was obtained at 100–105°/0.05 mm. as a light yellow-colored oil; $n_D^{20}=1.520$. It had a sweet musk and civet odor.

I claim:
2-methyl-8-phenyl-7-nonen-4-one.

References Cited in the file of this patent
UNITED STATES PATENTS

| | | |
|---|---|---|
| 2,760,998 | Surmatis | Aug. 28, 1956 |
| 2,795,617 | Kimel et al. | June 11, 1957 |
| 2,812,353 | Kimel | Nov. 5, 1957 |

OTHER REFERENCES

Carroll: J. Chem. Soc. (London) 1941, pages 507–11.